(12) United States Patent
Goudy et al.

(10) Patent No.: US 9,272,850 B2
(45) Date of Patent: Mar. 1, 2016

(54) DIVERSION APPARATUS

(71) Applicant: The Procter & Gamble Company, Cincinnati, OH (US)

(72) Inventors: Eric Shawn Goudy, Liberty Township, OH (US); Robert Paul Cassoni, Washington Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 14/225,553

(22) Filed: Mar. 26, 2014

(65) Prior Publication Data

US 2015/0274439 A1    Oct. 1, 2015

(51) Int. Cl.
| | | |
|---|---|---|
| *B65G 47/84* | (2006.01) | |
| *B65G 47/76* | (2006.01) | |
| *B65G 47/71* | (2006.01) | |
| *B07C 3/06* | (2006.01) | |
| *B65G 47/82* | (2006.01) | |

(52) U.S. Cl.
CPC ................. *B65G 47/766* (2013.01); *B07C 3/06* (2013.01); *B65G 47/71* (2013.01); *B65G 47/82* (2013.01); *B65G 47/84* (2013.01)

(58) Field of Classification Search
CPC ........... B65G 47/84; B65G 47/71; B07C 3/06
USPC .............. 198/367, 367.1, 368, 370.07, 459.2, 198/459.7, 457.07
See application file for complete search history.

(56) References Cited

U.S. PATENT DOCUMENTS

| | | | | |
|---|---|---|---|---|
| 3,768,644 | A | * | 10/1973 | Di Frank et al. .............. 209/559 |
| 3,791,518 | A | * | 2/1974 | Vanderhoof .................. 209/552 |
| 4,321,994 | A | | 3/1982 | Heuft |
| 4,369,873 | A | | 1/1983 | Heuft |
| 4,986,407 | A | | 1/1991 | Heuft |
| 5,048,665 | A | * | 9/1991 | Vickers .......................... 198/350 |
| 6,523,667 | B1 | | 2/2003 | Dingeldein et al. |
| 6,588,575 | B1 | | 7/2003 | Heuft et al. |
| 7,431,141 | B2 | * | 10/2008 | Nadeau et al. ............. 198/459.6 |
| 7,975,829 | B2 | * | 7/2011 | Rogers et al. ............ 198/457.07 |
| 8,261,936 | B2 | * | 9/2012 | DuMond et al. ................. 221/6 |
| 8,322,510 | B2 | * | 12/2012 | Pedrazzini ................. 198/346.2 |
| 2007/0209906 | A1 | | 9/2007 | Ranger et al. |

FOREIGN PATENT DOCUMENTS

| | | |
|---|---|---|
| JP | S63173122 U | 11/1988 |
| JP | H02127224 A | 5/1990 |
| WO | WO 2005/023689 A1 | 3/2005 |

OTHER PUBLICATIONS

Search Report for International Application Serial No. PCT/US2015/021934, mailed Jun. 11, 2015, 11 pages.

* cited by examiner

*Primary Examiner* — Leslie A Nicholson, III
(74) *Attorney, Agent, or Firm* — Gary J. Foose (57) ABSTRACT

A diversion apparatus for a manufacturing line.

13 Claims, 8 Drawing Sheets

DIVERSION APPARATUS

FIELD OF THE INVENTION

Diverting objects on a manufacturing line.

BACKGROUND OF THE INVENTION

Products are commonly produced on high speed manufacturing lines. For instance, some beer bottlers report filling line speeds in excess of 650 bottles per minute. At such high speed, the inertia of the moving parts of the manufacturing line and the containers being moved and filled can be a critical factor to design of the filling line.

As products move down a manufacturing line, it is not uncommon to have a need to divert a particular product from the main stream of products being manufactured. For instance, on a container labeling and filling line, the label on a particular container may be defective. The line may be equipped to detect defective labels by employing a vision system or other type of defect detection system. Once a defective label is detected, the line may timely activate a diversion apparatus to divert the container having a defective label out of the stream of articles that are destined for final packaging and distribution. Another defect that occasionally occurs is that the article of manufacture does not have the proper weight or a container filled with product does not have the correct weight. Such underweight products or filled containers may need to be separated from products that ultimately end up in the market so as to avoid disappointing the end consumer.

At high line speeds, the process of diverting a product needs to occur in a fraction of a second. Further, once the particle is diverted, the apparatus diverting the defective product must get out of the way of other products upstream of the defective product so that upstream products are not impeded. With these limitations in mind, there is a continuing unaddressed need for a diversion apparatus that can be used on high speed manufacturing lines.

SUMMARY OF THE INVENTION

A diversion apparatus comprising a diversion element, wherein said diversion element comprises: a follower link; a coupler engaged with said follower link by a cam; and an extensible and retractable input link engaged with said coupler; wherein said follower link, coupler, and input link are pivotably mounted to a frame.

DETAILED DESCRIPTION OF THE INVENTION

Figure 1:
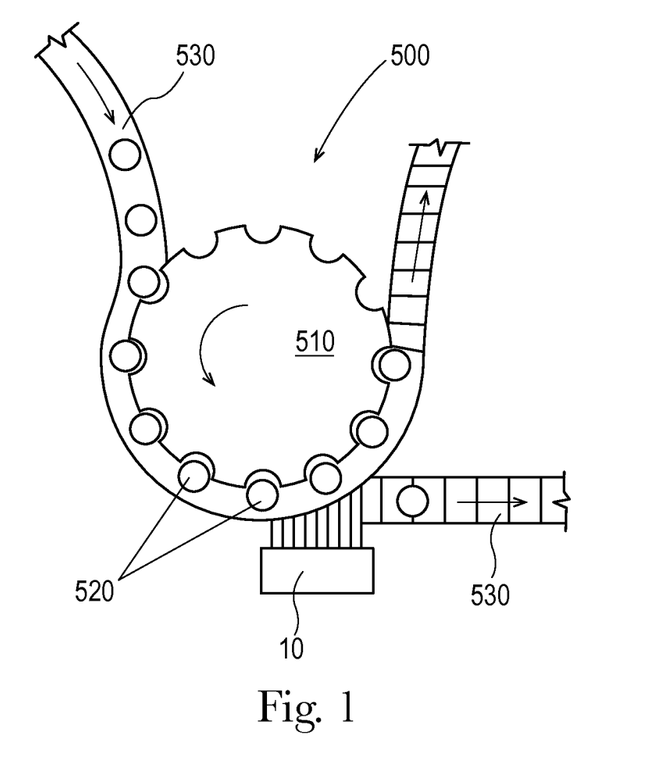
FIG. 1 is drawing of a manufacturing line employing a star wheel.

A top view of a portion of a typical arrangement of a manufacturing line 500 is shown in FIG. 1. The manufacturing line 500 can comprise a star wheel 510 into which products 520 enter. Products 520 may be fed into the star wheel 510 on a conveyor 530 or handed off from a star wheel upstream of star wheel 510 shown in FIG. 1. The diversion apparatus 10 can be operatively engaged with a star wheel 510.

The diversion apparatus 10 can have two or more positions to direct products 520 to different paths. For instance, one position of the diversion apparatus 10 can retain a product 520 on the star wheel and another position can permit a product 520 to be discharged from the star wheel 510. Depending on the desired configuration of the manufacturing line 500, products 520 that are to be further processed may be retained on the star wheel 510 and passed down stream for further processing. Alternatively, products 520 may be discharged to a conveyor 530 that transports the products 520 downstream for further processing. Identification of which products 520 are to be separated out of the primary stream of products can be done upstream of the diversion apparatus 10. Products 520 may be separated out of the stream as a result of a manufacturing defect such as a defective label, incorrect weight, leaky seal of a closure, or other type of defect.

Products 520 may be separated out of the stream to route the product 520 to another unit operation. For instance, if there is a choke point downstream of the diversion apparatus 10, the diversion apparatus 10 can be used to manage flow of products 520 to the choke point by diverting some of the products 520 along other pathways on the manufacturing line. For instance, a single end of line packing operation may be not have sufficient capacity to handle the number of products 520 produced upstream so the diversion apparatus 10 can act to fill a queue for one packing operation and then change the path of products 520 so as to deliver them to the queue of another packaging operation.

Figure 2:
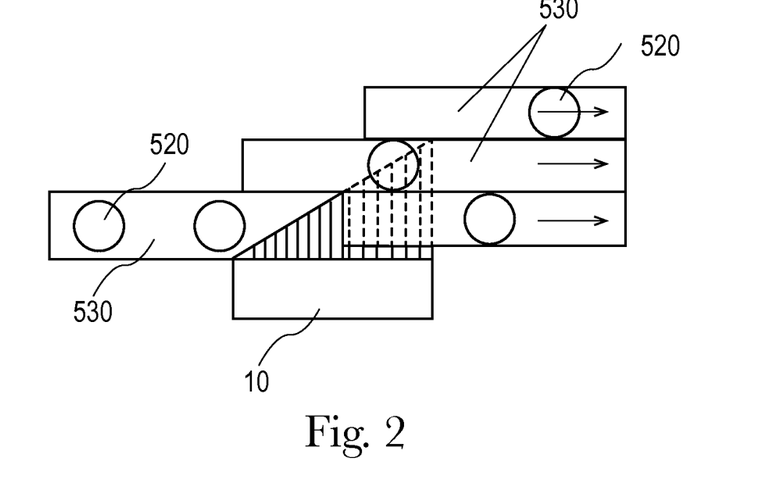
FIG. 2 is a drawing of a manufacturing line in which articles from a single conveyor distributed over a plurality of conveyors by a single diversion apparatus.

Another portion of a typical arrangement of a manufacturing line 500 is shown in FIG. 2. As shown in FIG. 2, a conveyor 530 can deliver the products 520 to the location of the diversion apparatus 10. The diversion apparatus 10 can selectively divert products to one or more adjacent conveyors 530. Any one or more the conveyors can function to collect and deliver defective products 520 or route products 520 as desired by the designer of the manufacturing line 500.

Figure 3:
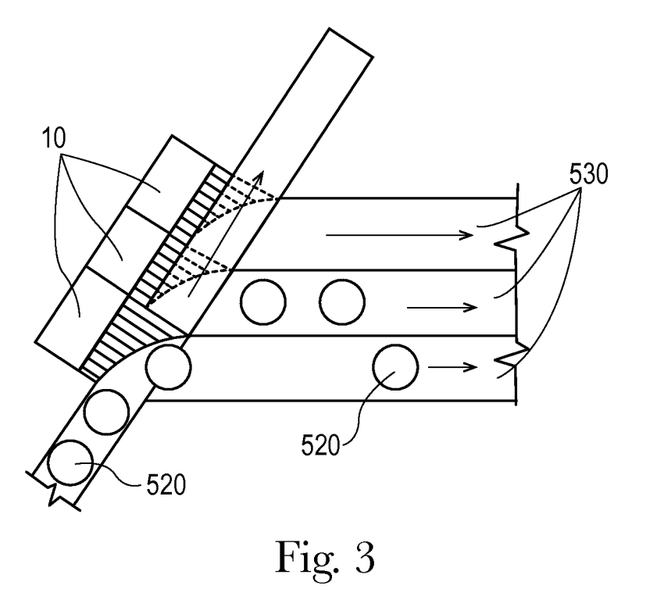
FIG. 3 drawing of a manufacturing line in which articles from a single conveyor distributed over a plurality of conveyors by a plurality of diversion apparatuses.

Another portion of a typical arrangement of a manufacturing line 500 is shown in FIG. 3. As shown in FIG. 3, a conveyor 530 can deliver the products 520 to the location of the diversion apparatus 10. A plurality of diversion apparatuses 10 can be used to selectively divert products to one or more adjacent conveyors 530.

Figure 4:
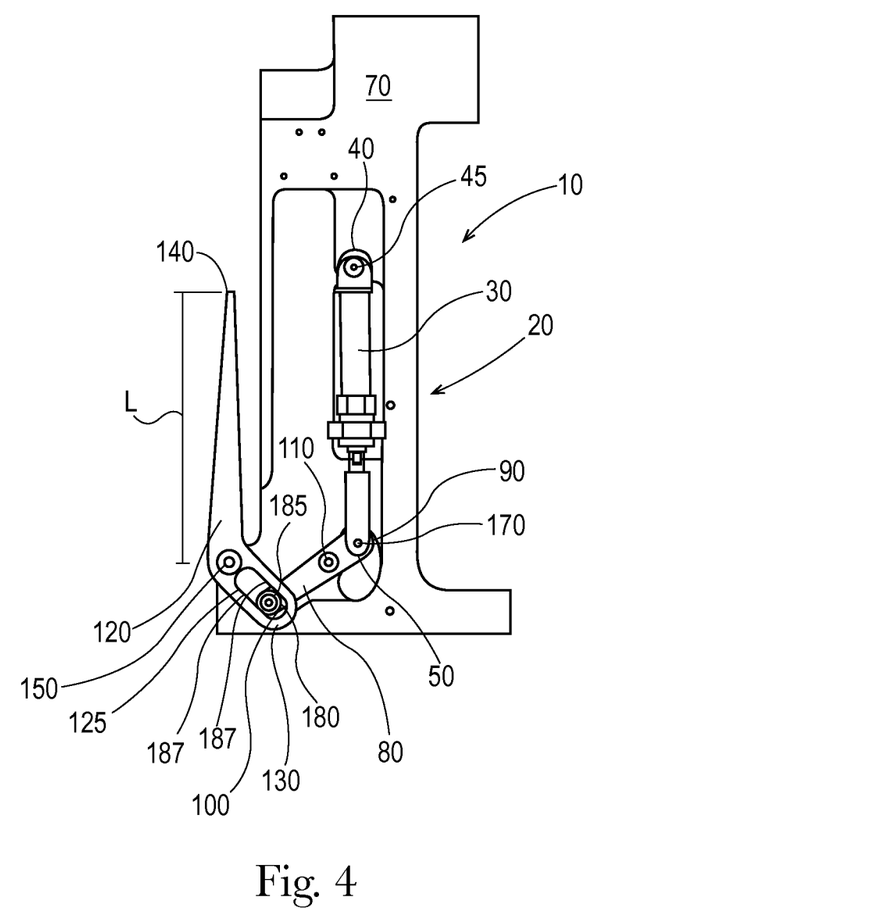
FIG. 4 is drawing of a diversion element in a first position.

A diversion element 20, one or a plurality of which can form the diversion apparatus 10, is shown in FIG. 4. The diversion element 20 can be a four bar linkage. The diversion element 20 can comprise a follower link 120, a coupler 80 engaged with the follower link 120 by a cam 180, and an extensible and retractable input link 30 engaged with the coupler 80. The follower link 120, coupler 80, and extensible and retractable input link 30 can be pivotably mounted to a frame 70. Together, the follower link 120, coupler 80, extensible and retractable input link 30, and frame 70 form a four bar linkage.

The follower link 120 can be the part of the diversion element 20 that acts to divert a product 520. The follower link 120 can contact the product 520 to be diverted. The follower link 120 can be provided with air vents at the follower link first end 140 from which air is emitted under pressure to provide a cushion between the follower link first end 140 and the product 520 being routed.

The follower link 120 can have a follower link first end 140 and a follower link pivot 150. The follower link pivot 150 can be between the cam 180 and the follower link first end 140. The follower link 120 can be pivotably mounted to the frame 70 by the follower link pivot 150. Pivoting of the follower link 120 about the follower link pivot 150 can be driven by the coupler 80 pivoting about the coupler pivot 110. The follower link 120 can have a follower link second end 130 opposing the follower link first end 140. The follower link pivot 120 can be between the follower link first end 140 and the follower link second end 130. The follower link second end 130 can be opposing the follower link first end 140. The follower link 120 can be considered to have a finger length L that is the distance between the follower link first end 140 and the follower link pivot 120.

The coupler 80 can be engaged with the follower link 120 by cam 180. As the cam 180 moves along its path the follower link 120 moves in response as the cam 180 moves along a surface of the follower link 120. The cam 180 can be a roller 185 attached to the coupler 80. The roller 185 can be a double shielded miniature high precision stainless steel ball bearing set part number 7804K102 available from McMaster-Carr, United States of America. The roller 185 can roll along one or more camming surfaces 187 of the follower link 120 and transmit force from the coupler 80 to the follower link 120. The follower link 120 can have a camming surface 187 upon or in which the cam 180 rides. The cam 180 can move by rolling. Optionally, the cam move by sliding. A rolling cam may be more durable than a sliding cam since there might be less friction. The follower link 120 can have camming surface 187. The camming surface 187 can be a slot 125 or channel in which the cam 180 moves, for example by rolling, sliding, or a combination thereof. The cam 180 can be a block slideably engaged with the follower link 120. For instance, the cam 180 can be a block that is slideably engaged with the slot 125 or channel in the follower link 120.

The coupler 80 and follower link 120 can be formed from metal, carbon fiber, DELRIN, or other suitably stiff and durable material.

Movement of the coupler 80 can be provided by an extensible and retractable input link 30 engaged with the coupler 80. As the extensible and retractable input link 30 extends and retracts the coupler 80 pivots around a coupler pivot 110 and the cam 180 moves along a path and contact of the cam 180 with the follower link 120 drives movement of the follower link 120 about the follower link pivot 150.

The coupler 80 couples the extensible and retractable input link 30 and the follower link 120. The coupler 80 can be considered to have a coupler first end 100 and an opposing coupler second end 90. The coupler first end 100 can be engaged with the follower link second end 130. For instance the coupler first end 100 can be engaged with the follower link second end 130 by cam 180. Further, the extensible and retractable input link 30 can be pivotably engaged with the coupler 80. For instance, the extensible and retractable input link 30 can be pivotably engaged with the coupler 80 at a first connection 175. The first connection 175 can be at or proximal to the coupler second end 90. The coupler 80 can be pivotably mounted to the frame 70 between the cam 180 and the first connection 175. The coupler 80 can be pivotably mounted to the frame 70 between the cam 180 and the coupler second end 90.

The extensible and retractable input link 30 can be pivotably mounted to the frame 70. The extensible and retractable input link 30 can be pivotably mounted to the frame 70 by an input link pivot 45. The input link pivot 45 can be provided at the proximal an end of the extensible and retractable input link 30. As the coupler 80 rotates about the coupler pivot 110, the location at which the extensible and retractable input link 30 and coupler 80 are engaged will travel a curved path. By pivotably mounting the extensible and retractable input link 30 to the frame 70, the extensible and retractable input link 30 can move to accommodate rotation of the coupler 80 about the coupler pivot 110 since the location at which the extensible and retractable input link 30 is engaged with the coupler 80 will travel a curved path.

The extensible and retractable input link 30 can be considered to have an input link first end 50 and an opposing input link second end 40. The input link first end 50 can be engaged with the coupler 80 through the first connection 175. The input link first end 50 can be engaged with the coupler second end 90. The input link second 40 can be pivotably engaged with the frame 70 by an input link pivot 45.

The input link pivot 45, coupler pivot 110, and follower link pivot 150 can be a simple shaft. The shaft can be made of steel, carbon fiber, titanium, brass, aluminum, or other sufficient strong material. The input link pivot 45, coupler pivot 110, and follower link pivot 150 can be part number 90265A127 available from McMaster-Carr, United States of America.

Figure 5:
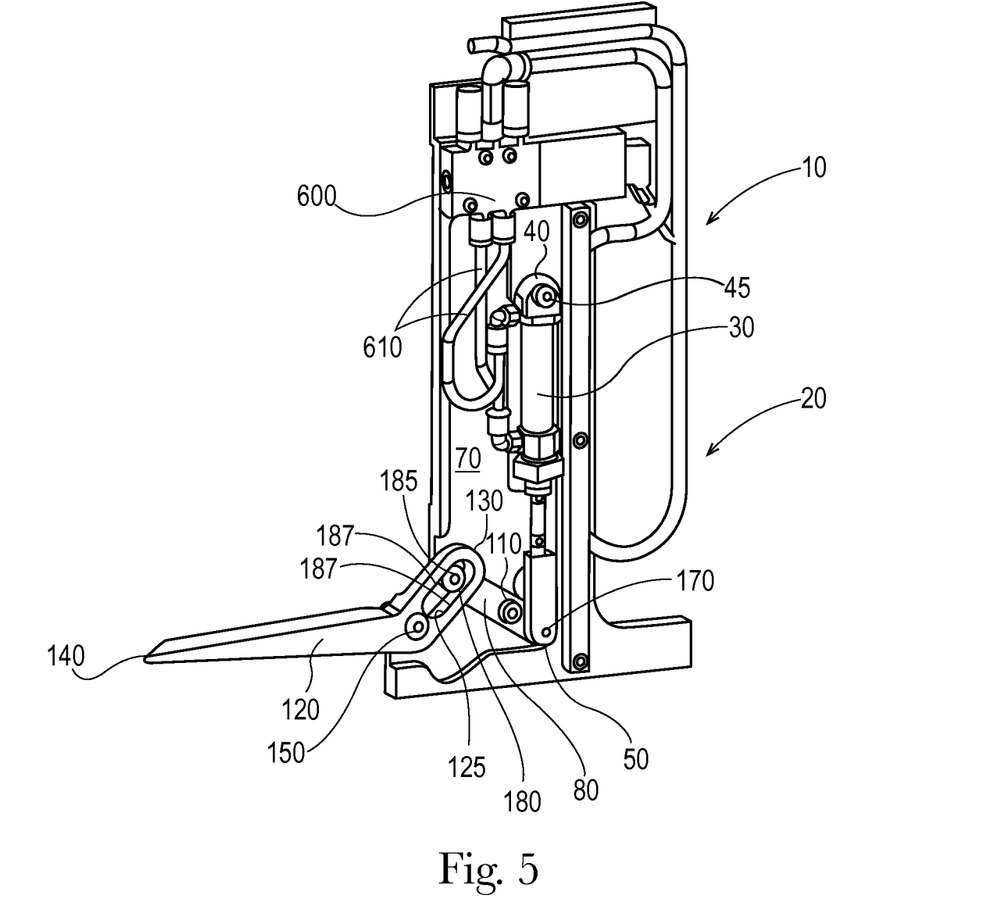
FIG. 5 is a drawing of a diversion element in a second position.

The diversion element 20 can have a first position, as illustrated in FIG. 4 and a second position as shown in FIG. 5. Movement of the diversion element 20 is provided for by the extensible and retractable input link 30. When the extensible and retractable input link 30 moves from a retracted first position, as shown in FIG. 4, to an extended second position as shown in FIG. 5, the follower link 120 moves from an upright position that does not direct movement of products 520 to a down position that operates to direct the movement of the products 520 or to move the products 520. The diversion element 20 can also act to divert a single product 520 by pushing the product away from the diversion apparatus 10. For example, the diversion element 20 can push a box from one conveyor 530 to another. In such an arrangement as the follower link 120 rotates from the first position illustrated in FIG. 4 to the second position illustrated in FIG. 5, the follower link first end 140 can push on the product 520 to be moved or diverted. As the follower link 120 rotates about the follower link pivot 150, the follower link first end 140 can push the product away from the diversion apparatus 10.

A diversion element 20 as described herein can be particularly practical for high speed manufacturing lines, such as, by way of non-limiting example, liquid filling packaging lines. At line speeds in excess of 600 products per minute. A diversion apparatus 10 has less than one tenth of a second to selectively divert a single product. So, the diversion element, or elements, must deploy, redirect the product 520 or permit the product 520 to travel another path, and retract in the process of operating on a single product 520. Such rapid speeds for movements of machine parts can be problematic because starting and stopping the movement without having any rebound is challenging. For instance, for the diversion element 20 described herein, when the diversion element is moved from the second position shown in FIG. 5 to the first position shown in FIG. 4 to get out of the way of products 520 upstream of the diversion apparatus 10, the follower link 120 needs to not rebound from the rapid movement to the first position. The diversion element 20 or elements 20 can be designed to operate at more than about 400 products 520 per minute at a pitch of about 188 mm.

Rebound of the follower link 120 needs to be avoided because it has the potential to result in the follower link bouncing partially back towards the second position and interfering with an upstream product 520 moving past the diversion apparatus 10. Since the time of movement needs to be short on a high speed manufacturing line, the tolerances of spacing of different components of the line needs to be tight to minimize the distance parts need to move to be in operable position. Rebound of machine parts needs to be avoided because rebound can result in violation of the tolerances.

It is believed that in typical diversion apparatus, rebound arises as a result of the inertia of the finger that acts to divert product. Rebound of the finger as it is moved from the position in which it acts on products to a position in which products can pass the diversion apparatus without being acted on by the finger can be particularly problematic. If the finger bounces once it has been raised, the bounce may result in the finger bouncing out into the path of an on-coming product. If the on-coming product is an empty plastic bottle, the finger can bounce out and impact the empty plastic bottle and tip it over or cause it to interact improperly with other components of the manufacturing line. If the product is a heavy product, the collision between the product and the finger can damage the product and or the finger. The problem of bounce is particularly acute in a diversion apparatus in which the finger is directly connected to an air cylinder. As the finger is pulled in by an air cylinder, the finger hits a stop, bounces off of the stop and the only thing restraining further movement of the finger is air in the air cylinder. Since air is compressible, the finger can bounce.

In the diversion element 20 describe herein, the input link 30 pushes the coupler 80. The coupler 80 pushes the cam 180 to move along a surface of the follower link 120. As the cam 180 moves along its path the follower link 120 moves in response as the cam 180 moves along a surface of the follower link 120. When the follower link 120 is in a down position, as in FIG. 5, the coupler 80 is traveling almost perpendicular to the path of the cam 180 so the cam 180 is traveling generally in line with the path of the cam 180. In such a relationship, the large movements of the coupler 80 and cam 180 translate into only small movements of the follower link 120.

As the coupler 80 moves further, the follower link 120 and coupler 80 rotate. The cam 180 is no longer traveling a path generally in line with the path of the cam 180. As the cam 180 pushes on the surface of the follower link 120 and the follower link 120 moves rapidly.

At the end of movement of the follower link 120 from the down position to the up position shown in FIG. 4, the cam 180 is travelling generally in line with the path of the cam 180. So, a large movement in the cam 180 translates into only a small movement of the follower link 120. This permits transfer of the inertia from the follower link 120 back through the coupler 80 and into the coupler pivot 110. Such benefit may not be available if a multi-bar linkage in which all the connections from the diversion element to the input link are pivoting connections.

Also shown in FIG. 5 are solenoid valves 600 that control application of air pressure through hoses 610 to the extensible and retractable input link 30 if an air cylinder is used as the extensible and retractable input link 30.

Figure 6:
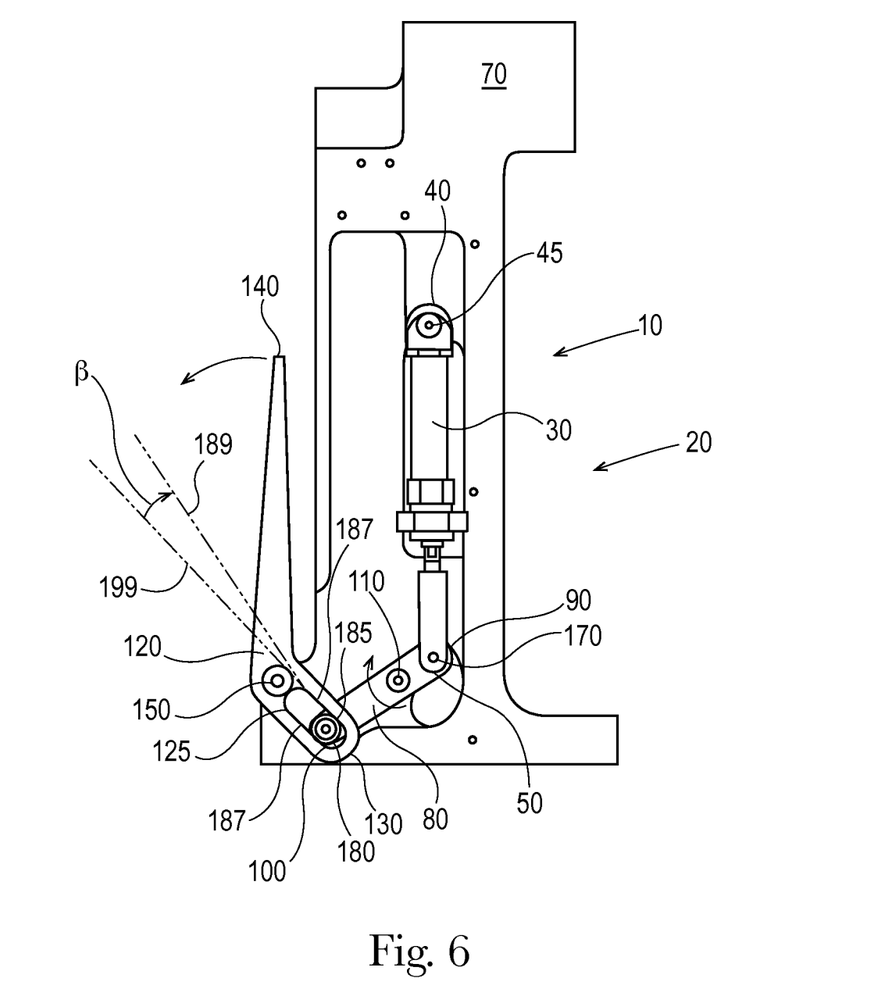
FIG. 6 is drawing of a diversion element in a first position showing the angle.
Figure 7:
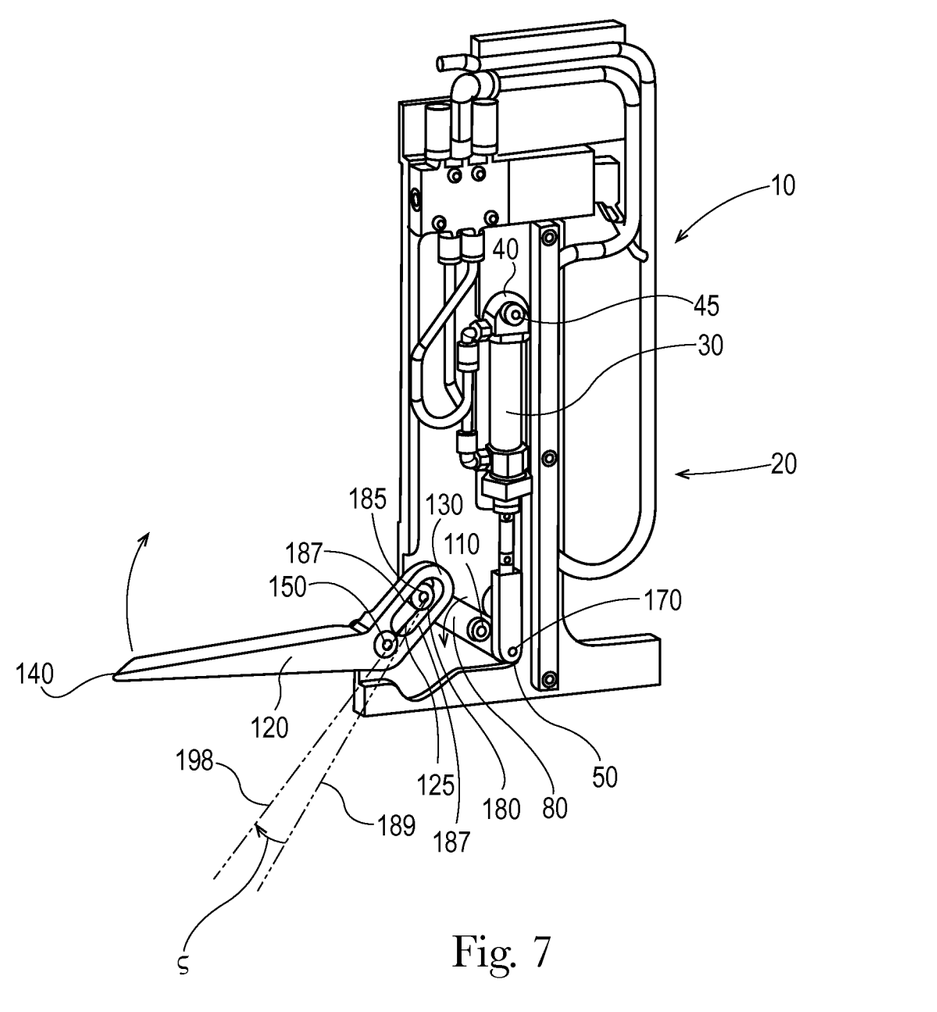
FIG. 7 is a drawing of a diversion element in a second position, illustrating the angle.
Figure 8:
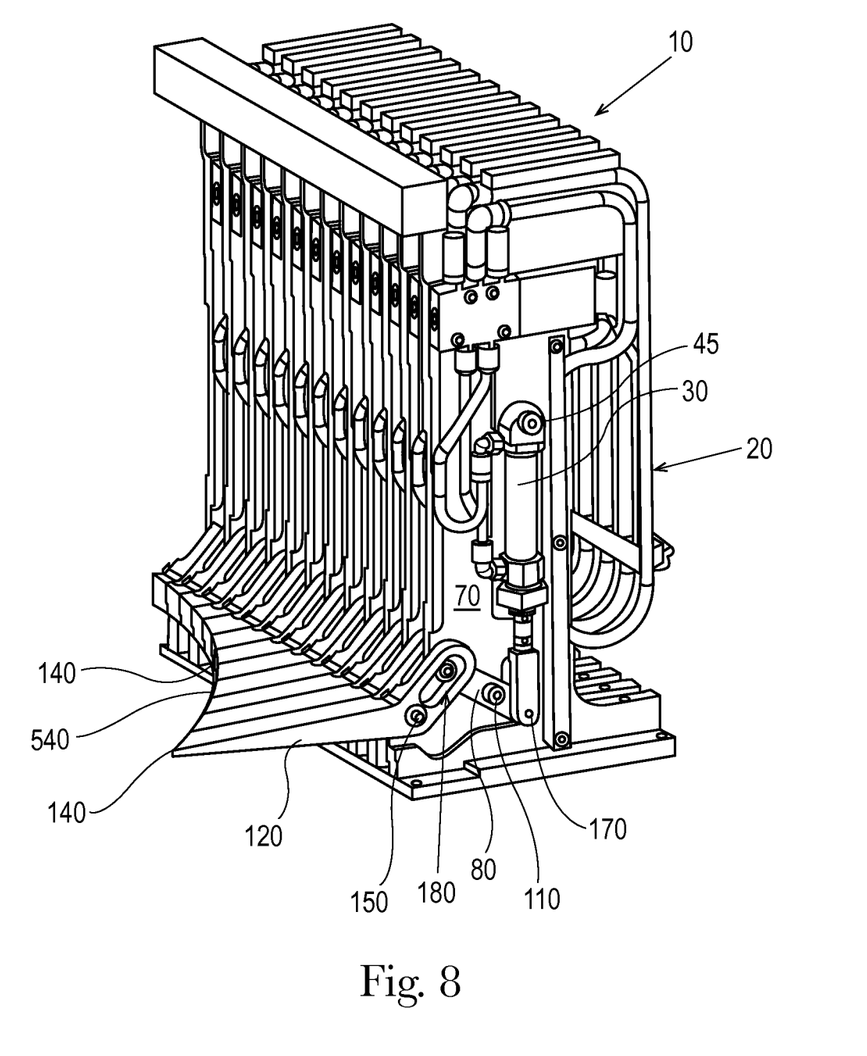
FIG. 8 is a drawing of a diversion apparatus comprising a plurality of diversion elements.

As described herein, the diversion apparatus 10 can have a first position as shown in FIG. 6 and a second position as shown in FIG. 7. The first position and the second position are at the bounds of the range of motion of the follower link 120.

In describing the mechanism of the cam 180 it can be convenient to consider that the cam 180 cooperates with a camming surface 187, as shown in FIGS. 6 and 7.

The cam 180 is operatively engaged with the coupler 80. The camming surface 187 is operatively engaged with the follower link 120. The cam 180 provides the driving force for moving the follower link 120. The camming surface 187 provides for a mobile location for the transfer of force from the cam 180 to the follower link 120.

When the diversion apparatus 10 is transitioned from the first position to the second position, initial movement of the cam 180 is with 25 degrees of the first orientation of the camming surface 187. When the diversion apparatus 10 is transitioned from the second position to the first position, initial movement of the cam 180 can be within about 45 degrees of the second orientation of the camming surface 187.

Movement of the cam 180 is rotational about the coupler pivot 110. Thus, initial movement of the cam 180 is tangential to a radius defined by a line between the coupler pivot 110 and the cam 180. A projection of the initial movement of the cam 180 is shown in FIG. 6 and is designated the initial cam movement projection 189. The first orientation of the camming surface 187 is tangential to the location at which the cam 180 contacts the camming surface 187 when the diversion apparatus 10 is in the first position. A projection of the camming surface 187 when the diversion apparatus 10 is in the first position is shown in FIG. 6 and designated the first orientation of the camming surface projection 199. The initial cam movement projection 189 and the first orientation of the camming surface projection 199 are illustrative of the relationship between the direction of initial movement of the cam 180 and orientation of the camming surface 187.

The second orientation of the camming surface 187 is tangential to the location at which the cam 180 contacts the camming surface 187 when the diversion apparatus 10 is in the second position. A projection of the camming surface 187 when the diversion apparatus 10 is in the second position is shown in FIG. 6 and designated the second orientation of the camming surface projection 198.

If the camming surface 187 is straight, then the first orientation and second orientation of the camming surface 187 is a straight line coincident with the camming surface 187 when the diversion apparatus 10 is in the respective first position or second position. If the camming surface 187 is curved, then the first orientation and second orientation of the camming surface 187 is a straight line tangent to the camming surface 187 at the location at which the cam 180 contacts the camming surface 187 when the diversion apparatus 10 is in the respective first position or second position.

The angle between the initial movement of the cam 180 and the first orientation of the camming surface 187 is marked in FIG. 6. The angle is between the first orientation of the camming surface projection 199 and the initial cam movement projection 189.

The angle between the initial movement of the cam 180 and the second orientation of the camming surface 187 is marked in FIG. 7. The angle is between the second orientation of the camming surface projection 198 and the initial cam movement projection 189. The angles and can be less than about 45 degrees.

The angle is between the second orientation of the camming surface projection 198 and the initial cam movement projection 189. The angles and can be less than about 35 degrees. The angle is between the second orientation of the camming surface projection 198 and the initial cam movement projection 189. The angles and can be less than about 25 degrees. The angle is between the second orientation of the camming surface projection 198 and the initial cam movement projection 189. The angles and can be less than about 25 degrees. To provide for an even more gradual translation of rotational movement of the cam 180 into movement of the follower link 120, the angles and can be less than about 15 degrees. To provide for an even more gradual translation of rotational movement of the cam 180 into movement of the follower link 120, the angles and can be less than about 8 degrees. To provide for an even more gradual translation of rotational movement of the cam 180 into movement of the follower link 120, the angles and can be less than about 3 degrees.

The diversion apparatus 10 can comprise a plurality of the diversion elements 20, for example as shown in FIG. 7. The diversion elements 20 can be arranged so that movement of the follower links 120 are in planes parallel to one another and the movement is in the same direction. Further, for practicality of sizing and dimensioning the apparatus 10, it can be practical for the axis of rotation of each of the follower link pivots 150 to be about a common axis. This can be provided for by aligning each of the follower link pivots 150 or having each of the follower link pivots 150 be a part of common axel. Further, it can also be practical for the axis of rotation of each of the coupler pivots 110 be about a common axis and input link pivots 45 be about a common axis, for example by employing a common axel for each of such pivots.

The follower links 120 of the plurality can have the same finger length L. This might be practical in situations where the force required for moving a product 520 is greater that what a single extensible and retractable input link 30 can provide.

In a diversion apparatus 10 provided with a plurality of diversion elements 20, each of the follower links 120 can have a follower link first end 140 and a follower link pivot 150 and a finger length L between the follower link first end 140 and the follower link pivot 150. The follower links 120 can be arranged from shortest finger length L to longest finger length L. The lengths L of the follower links 120 can be sized and dimensioned to provide for a desired pathway of movement for products 520 encountering the diversion elements 20 of the diversion apparatus 10. For example, the difference in finger length L of adjacent follower links 120 can be uniform so that when the follower links 120 are in the second position, the follower link first ends 140 are in a line with one another. Finger length L can be a linear function of position of the follower link first ends 140. Arranged as such, when the follower links 120 are in the second position, the follower links 120 can present a straight deflecting surface, by way of non-limiting example a wedge, to the deflect the product being conveyed past the diversion apparatus 10.

The finger length L can be a curved function of position of the follower link first ends 140. For example, as shown in FIG. 7, follower links 120 in the second position can present a curved deflecting surface 540 to deflect one or more products 520. The follower link first ends 140 can be tapered so that they form, when extended, a substantially smooth deflecting surface 540. The taper of the follower link first ends 140 can increase in the direction of conveyance. The taper of the follower link first ends 140 can increase to give the deflecting surface 540 a parabolically curved configuration so that the acceleration of the product 520 is uniform as the direction of the product is changed. The deflecting surface 540 can extend all the way to the position to where the product 520 is being directed. Optionally, the deflecting surface 540 can extend partially to the position where the product 520 is being directed and momentum of the product 520 will carry the product 520 to the desired position.

The extensible and retractable input link 30 can be an air cylinder, a hydraulic cylinder, a solenoid, or other kind of link that is extensible and retractable, such as a linear motor. The extensible and retractable input link 30 can be a Festo standard cylinder CRDSNU-12-19-P-A. If the extensible and retractable input link 30 is an air cylinder that can be driven in 2 directions, air pressure to the air cylinder can be controlled a solenoid valve such as a Festo MHE2-MS1H-5-2-M7. The air pressure can be between about 0.14 MPa to about 0.55 MPa.

A microcontroller, such as an Allen Bradley Micro 850 48 I/O EtherNet/IP Controller, can be used to control the solenoid valves. Each of the extensible and retractable input links 30 can be controlled by a single solenoid. Each of the extensible and retractable input links 30 can be independently controlled. The microcontroller may receive a pulsed input from the conveyor, star wheel, or other conveyance means to inform the microcontroller how fast products 520 on the line are moving.

In operation, there can be sensors upstream of the diversion apparatus 10. Those sensors keep track of the position, speed, and pitch of the manufacturing line and products 520 thereon and that information is sent to a computer. There can also be sensors upstream of the diversion apparatus 10 that can detect defects. The computer can be provided with software that process the information transmitted from the sensors. If a defect is detected, or the software determines that a product 520 is to be diverted, the computer can track the product 520 to be diverted. When th product 520 reaches the diversion apparatus 10, the computer can send a signal to the microcontroller controlling the diversion apparatus 10 to move the extensible and retractable input links 30 to move follower links 120 as desired, for instance to allow or force a product 520 to travel on another path.

When signaled by the computer, the microcontroller can execute a program that directs the solenoids controlling pressure applied to the input link 30 to open and apply pressure to the side of the air cylinder required to produce the desired extension or retraction of the extensible and retractable input link 30. The microcontroller can be programmed to fire the solenoids controlling air pressure. If there are a plurality of diversion elements 20, the microcontroller can be programmed to fire the solenoids sequentially so that the follower links 120 are sequentially moved. In one situation for operation, the follower links 120 may be in the second position shown in FIG. 5 and the microcontroller can sequentially fire the solenoids so that the follower links 120 are moved sequentially from the follower link 120 having the shortest finger length L to the follower link 120 having the longest follower link 120. This firing of the solenoids can be done sequentially when moving the diversion elements 20 from either position to the other.

The diversion apparatus 10 can be employed in multiple ways as shown in FIGS. 1-3. For instance in a star wheel 510, the normal mode of operation may be to have the follower links 120 in a second position as shown in FIG. 5 to keep products 520 on the star wheel 510. When a product 520 is to be removed, the diversion apparatus 10 raises the one or more follower links 120 allowing the product 520 to leave the star wheel 510. Alternatively the stream of products 520 could be leaving the star wheel and the computer could determine that is desirable to retain one of the products on the star wheel or redirect the flow of products 520 to be retained on the star wheel 510.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A diversion apparatus comprising a diversion element, wherein said diversion element comprises:
    a follower link;
    a coupler engaged with said follower link by a cam; and
    an extensible and retractable input link engaged with said coupler;
    wherein said follower link, coupler, and input link are pivotably mounted to a frame; wherein said coupler is pivotably engaged with said extensible and retractable input link at a first connection; wherein said coupler is pivotably mounted to said frame between said cam and said first connection.

2. The diversion apparatus according to claim 1, wherein said diversion apparatus comprises a plurality of said diversion elements.

3. The diversion apparatus according to claim 2, wherein each said follower link has a follower link first end and a follower link pivot and a finger length between said follower link first end and said follower link pivot, wherein said follower links are arranged from shortest finger length to longest finger length.

4. The diversion apparatus according to claim 3, wherein each of said extensible and retractable input links is independently controlled.

5. The diversion apparatus according to claim 4, wherein said follower link comprises a camming surface operatively engaged with said follower link, wherein said camming surface has an first orientation when said diversion apparatus is in a first position and a second orientation when said diversion apparatus is in a second position;
    wherein when said diversion apparatus is transitioned from said first position to said second position, initial movement of said cam is within 45 degrees of said first orientation of said camming surface; and
    wherein when said diversion apparatus is transitioned from said second position to said first position, initial movement of said cam is within about 45 degrees of said second orientation of said camming surface.

6. The diversion apparatus according to claim 5, wherein each of said cams is a roller cam.

7. The diversion apparatus according to claim 6, wherein said diversion apparatus is operatively engaged with a star wheel.

8. The diversion apparatus according to claim 1, wherein said input link is axially extensible and retractable.

9. The diversion apparatus according to claim 7, wherein said input link is an air cylinder.

10. The diversion apparatus according to claim 1, wherein said cam is a roller cam.

11. The diversion apparatus according to claim 10, wherein said cam comprises a slot in said follower link.

12. The diversion apparatus according to claim 1, wherein said follower link comprises a camming surface operatively engaged with said follower link, wherein said camming surface has an first orientation when said diversion apparatus is in a first position and a second orientation when said diversion apparatus is in a second position;
    wherein when said diversion apparatus is transitioned from said first position to said second position, initial movement of said cam is within about 45 degrees of said first orientation of said camming surface; and
    wherein when said diversion apparatus is transitioned from said second position to said first position, initial movement of said cam is within 25 degrees of said second orientation of said camming surface.

13. The diversion apparatus according to claim 1, wherein said follower link comprises a camming surface operatively engaged with said follower link, wherein said camming surface has an first orientation when said diversion apparatus is in a first position and a second orientation when said diversion apparatus is in a second position;
    wherein when said diversion apparatus is transitioned from said first position to said second position, initial movement of said cam is within about 25 degrees of said first orientation of said camming surface; and
    wherein when said diversion apparatus is transitioned from said second position to said first position, initial movement of said cam is within 25 degrees of said second orientation of said camming surface.

* * * * *